(12) United States Patent
Seaman et al.

(10) Patent No.: US 7,823,185 B1
(45) Date of Patent: Oct. 26, 2010

(54) SYSTEM AND METHOD FOR EDGE MANAGEMENT OF GRID ENVIRONMENTS

(75) Inventors: James W. Seaman, Falls Church, VA (US); David Steele, Ijamsville, MD (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 1140 days.

(21) Appl. No.: 11/147,227

(22) Filed: Jun. 8, 2005

(51) Int. Cl.
*G06F 17/00* (2006.01)
(52) U.S. Cl. .......................................... 726/1; 709/201
(58) Field of Classification Search ....................... 726/1
See application file for complete search history.

(56) References Cited

U.S. PATENT DOCUMENTS

| | | | |
|---|---|---|---|
| 7,512,965 B1 * | 3/2009 | Amdur et al. .................. | 726/1 |
| 2004/0210627 A1 * | 10/2004 | Kroening ..................... | 709/201 |
| 2005/0081097 A1 * | 4/2005 | Bacher et al. ................. | 714/13 |
| 2006/0167966 A1 * | 7/2006 | Kumar et al. ................. | 709/201 |
| 2008/0222025 A1 * | 9/2008 | Fellenstein et al. ............ | 705/37 |

OTHER PUBLICATIONS

Tom Markham, Security at the Network Edge: A distributed firewall Arichitecture; IEEE 2001, pp. 279-286, Retrieved date Nov. 26, 2009.*
Klaus Krauter, A Taxonomy and Survery of Grid Resource Management Systems 2002; pp. 1-29, Retrieved date Nov. 26, 2009.*

* cited by examiner

*Primary Examiner*—Jung Kim
*Assistant Examiner*—Samson B Lemma
(74) *Attorney, Agent, or Firm*—Oblon, Spivak, McClelland, Maier & Neustadt, L.L.P.

(57) ABSTRACT

A system, method, and computer program product for increasing security of grid enabled computing environments. The system, method, and computer program product include: scheduling execution of a computing job; determining if an edge policy exists for the computing job; tracking said execution of the computing job; dividing the computing job into portions; assigning the portions of the computing job according to the edge policy; determining if there is an attempt to violate the edge policy; and prohibiting a violation of the edge policy.

25 Claims, 6 Drawing Sheets

SYSTEM AND METHOD FOR EDGE MANAGEMENT OF GRID ENVIRONMENTS

BACKGROUND OF THE INVENTION

1. Field of the Invention

The invention relates generally to managing grid enabled computing environments, and particularly to increasing the security of grid enabled computing environments by implementing an edge management system.

2. Description of the Related Art

Edge management relates to how broadly a given grid job should be able to expand across a computing infrastructure. A grid job is a computer processing job that is portioned out across a plurality of processors. As the grid job expands across different boundaries separating different computing environments, there is an increased risk that sensitive information will be processed on a node that is insufficiently secure.

Grid schedulers accept applications and jobs submitted by users and provide the mechanism to deploy such jobs and applications on the grid computing equipment based on scheduling policies. Grid schedulers currently utilize various security components to ensure information is processed in a sufficiently secure mode. For example, grid enabled computing environments use security standards for authentication such as those described in proposed standards such as open grid service infrastructure (OGSI). Or, a grid environment may use platform security standards for hardware and software such as in a Government certification. However, some grid applications may have security needs that even a certified platform cannot satisfy. Additionally, grid security is conventionally defined within the scheduling function, and as such, an error introduced when scheduling a grid job, or hundreds of grid jobs, may cause jobs to run in environments less secure than intended.

A conventional manner of implementing grid computing is to use a cluster of computers in a grid-like fashion. This enables computers to pool processing power. However, even within a single corporate organization, sharing resources can be difficult because two separate groups may own those different clusters, and each of the groups may use their own schedulers that apply a different set of rules. It is not easy to coordinate security policies across schedulers for different clusters. In situations where there are two, three or four different schedulers, if someone makes a mistake scheduling a job and does not give the job an appropriate level of security, there is nothing in place to prevent the job from being processed on an insufficiently secure node.

In a cluster form of grid computing, generally the scheduler is limited to the resources within that given cluster. If there is more than one cluster within an organization, there can be grid activity between clusters and schedulers. For example, scheduler A not only sends local jobs through scheduler A's local cluster, scheduler A can also send work to other clusters within the organization.

The cluster configuration is not true grid computing, but rather is a quasi-form of grid computing or a grid-like environment. An example of a quasi-form of grid computing would be a cluster of computers in an accounting department of an organization that form a grid that does not expand outside of that particular cluster. A true grid computing environment is able to use resources outside of a particular cluster.

For example, when expanding beyond the grid-like environment discussed above, one subnet (an interconnected portion of a network sharing a network address, but distinguishable by a subnet) may contain two machines: one server with payroll records, and a second server that tests new application code. The first server would have more stringent edge/security requirements than the second. Conventional schedulers lack the security features to enable true grid computing. To prevent the more sensitive payroll information from being processed on the less secure second server, the need arises for a comprehensive edge manager for grid enabled computing environments. In addition, when using grid computing equipment that is external to an organization's computing environment, the management of security becomes even more critical than when using equipment that is part of the organization's own environment. If scheduler A issues an instruction to parallelize a job out to 1,000 nodes and there are only 400 nodes in-house, the 600 nodes outside the organization that are used must be carefully selected.

Most conventional schedulers lack the security features necessary to expand grids outside clusters. For example, OpenPBS (Portable Batch System), which is a freely available open source grid/cluster scheduler, does not enforce a security policy. OpenPBS uses the operating system security methods for user authentication (i.e., UNIX .rhosts file, which is not secure), access control lists, and firewall rules to restrict access to servers.

There are schedulers on the market today that include security as part of their scheduling policy. However, a flaw exists in the conventional scheduling mechanisms in their inability to ensure appropriate security is applied to a particular computing job. For example, in the situation where there are several different schedulers and somebody makes a mistake scheduling a job and does not provide the job with the appropriate level of security, there is nothing in place to prevent the job from being executed. The inventors have recognized the shortcomings of existing systems and have developed, in an exemplary embodiment of the present invention, an edge manager that would establish corporate level security policies and could prohibit a scheduler from executing a job submitted with an insufficient level of security by overriding the scheduler.

The present inventors recognized that the inadequate security offered by conventional schedulers is a factor favoring the use of grid-like environments, rather than true grid environments.

The present inventors also recognized that the increasing demand for computer processing resources has created a need for equipment that will better manage and maximize existing resources. Money could be saved by reducing the amount of computer equipment that is not being fully utilized. Rather than buying new, expensive, specialized equipment that has a lot of processing power, jobs could be distributed over a plurality of processors. Distributing jobs over a plurality of processors allows less expensive machines to be purchased and used. A system that securely uses a plurality of processors for a particular job also could increase the speed with which that job is completed. A job that would take three weeks could take only 24 hours if equipment to better manage existing processing resources existed.

Furthermore, no complete intra-site to inter-site solution has been developed that would manage, based on data security requirements, the extent to which a grid-job may parallelize outside of the local computing environment. Conventional systems manage the risk of processing secure information on an unsecure node by using a policy based edge manager that will not allow any grid enabled job to traverse the global grid beyond what is defined as secure for that particular job or job environment. The present invention would allow jobs that require a secure environment to run in a wider grid by providing a mechanism for addressing the security issue in a suitable manner.

SUMMARY OF THE INVENTION

An object of the present invention is to address the above-identified and other limitations of conventional grid environments.

In an exemplary embodiment, there is a method of edge management, including steps of: scheduling execution of a computing job; determining if an edge policy exists for the computing job; tracking the execution of the computing job; dividing the computing job into portions; assigning the portions of the computing job according to the edge policy; determining if there is an attempt to violate the edge policy; and prohibiting a violation of the edge policy.

In another exemplary embodiment, the method of edge management further includes a step of determining if an edge policy exists for the computing job each time a portion of the computing job is assigned to a node in a different computing environment.

In another exemplary embodiment, the step of prohibiting includes transmitting a command that ceases processing of data by a node that violates the edge policy.

In another exemplary embodiment, the step of prohibiting includes preventing or ceasing transmission of data to a node that violates the edge policy.

In another exemplary embodiment, the step of assigning includes transmitting a first agent to a computer assigned to process the computing job; transmitting a second agent to a scheduler of the computer assigned to process the computing job; transmitting information about the computer assigned to process the computing job to an edge manager; and causing the scheduler to override its existing policies to enforce the edge policy provided by the edge manager.

In another exemplary embodiment, the step of assigning includes placing a query to the computer assigned to process the computing job, wherein the responsive information about the computer assigned to process the computing job enables the edge manager to determine whether the assigned computer complies with the edge policy.

In another exemplary embodiment, the edge management policy is at least one of an application job policy, a cluster participation policy, a sever/platform policy, a specific IP/MAC address mapping policy, a source subnet/network policy, a source hostname/username policy, a number of hops to destination policy, a communications protocol policy, and an attenuation policy.

In another exemplary embodiment, the method of edge management is applied within a single computing environment.

In another exemplary embodiment, the method of edge management is applied across at least one of a global Internet, an Internet by country code, an Internet USA, a corporate network, a subnet, a cluster, and a server.

The present invention is also embodied in a system for edge management including a computing environment configured to communicate with a node outside of the computer environment through a network, the computing environment including: a scheduler configured to schedule execution of a computing job; and an edge manager configured to determine if an edge policy exists for the computing job, to track the execution of the computing job, to assign a portion of the computing job to the node according to the edge policy, to determine if there is an attempt to violate the edge policy, and to prohibit a violation of the edge policy by the node.

In another exemplary embodiment, the node is inside the computing environment.

In another exemplary embodiment, the edge manager includes a transmission device configured to transmit a command that controls the node, where the command prohibits the node from violating the edge policy.

In another exemplary embodiment, the edge manager includes a transmission device configured to transmit data to be processed by the node, where the transmission device prohibits or ceases transmission of data to prevent the node from violating the edge policy.

In another exemplary embodiment, the system further includes a transmission device configured to transmit a first agent of the edge manager to the node, where the first agent is configured to transmit information about the node to the edge manager.

In another exemplary embodiment of the system, the computing environment and node each operate with a scheduler, and the transmission device is further configured to transmit a second agent of the edge manager to the scheduler of the node, and the second agent enables the scheduler of the node to enforce the edge policy.

The present invention is also embodied in a computer configured to operate in a grid computing environment including: a scheduler configured to schedule execution of a computing job; and an edge manager configured to determine if an edge policy exists for the computing job, to track the execution of the computing job, to assign a portion of the computing job to a node according to the edge policy, to determine if there is an attempt to violate the edge policy, and to prohibit a violation of the edge policy by the node.

In another exemplary embodiment, the computer further includes a transmission device configured to transmit a command that controls a node assigned a portion of the computing job, where the command prohibits the node from violating the edge policy.

In another exemplary embodiment, the computer further includes a transmission device configured to transmit data to be processed by a node, where the transmission device prohibits or ceases transmission of data to prevent the node from violating the edge policy.

In another exemplary embodiment of the computer, the transmission device is further configured to transmit an agent of the edge manager to the node, and the agent is configured to transmit information about the node to the edge manager.

In another exemplary embodiment of the computer, the transmission device is further configured to transmit a second agent of the edge manager to a scheduler of the node to allow the scheduler of the node to enforce the edge policy.

The present invention is also embodied in a computer program product storing instructions for execution on a computer system, which when executed by the computer system, causes the computer system to perform a method of edge management.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
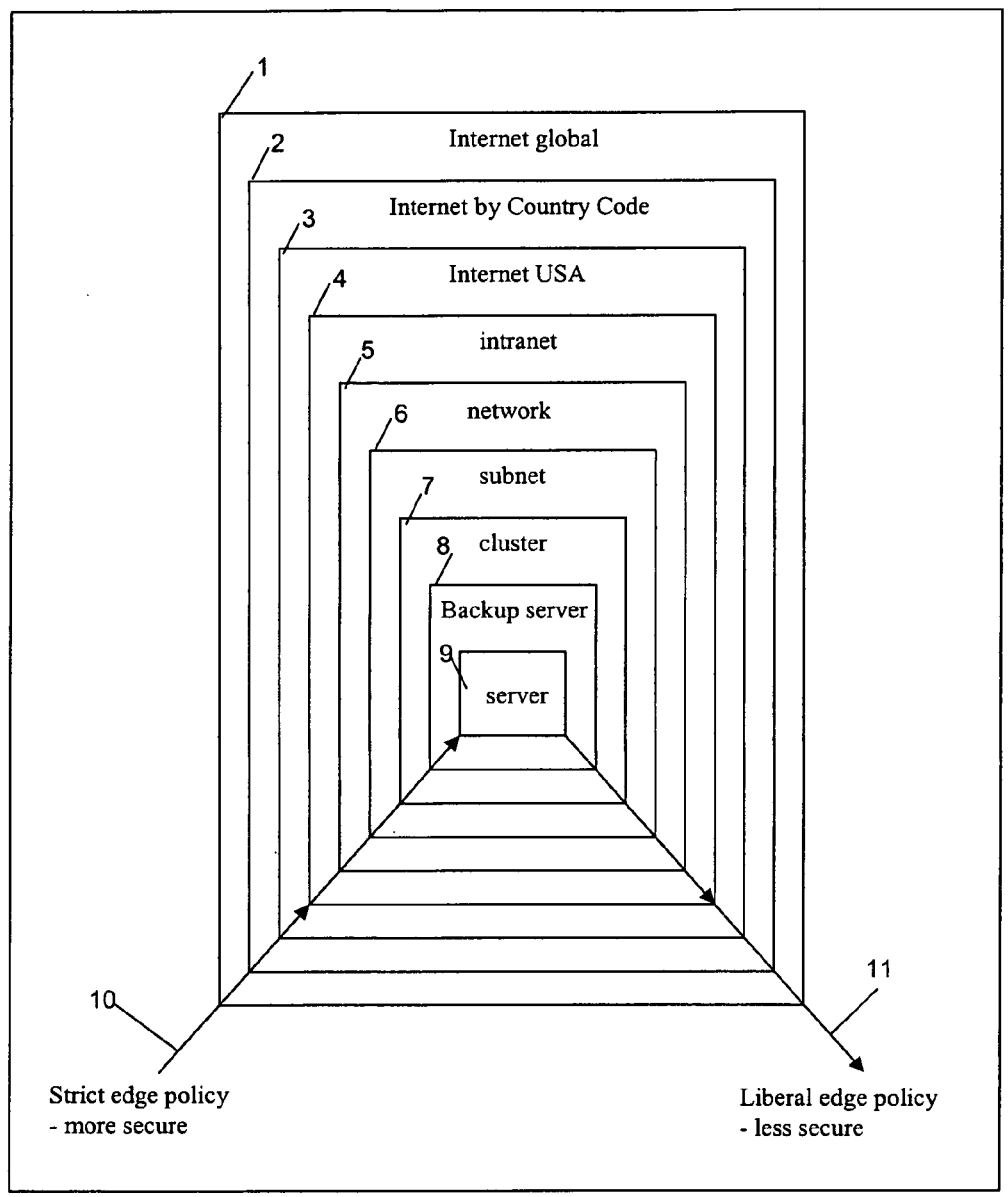
FIG. 1 is an example of edge management boundaries.

Referring now to the drawings, wherein like reference numerals designate identical or corresponding parts throughout the several views and more particularly to FIG. 1 thereof, there is depicted an example of edge management boundaries.

FIG. 1 depicts how, in the absence of the invention described herein, an increasingly broadened edge policy for a particular grid job results in a less secure environment. This is especially true once a grid job has traversed all corporate networks and enters the Internet grid where compliance with corporate policy concerning security of computing environments is not easily achieved. In FIG. 1, reference numerals 1-9 denote different computing environments, with Internet Global 1 being the most liberal edge policy (i.e., least secure) and server 9 being the strictest (i.e., the most secure) computing environment. Arrows 10 and 11 show how security of a computing environment changes as edge policy shifts from most secure to least secure. In an exemplary embodiment where data security is paramount (as in many computing environments), edge management policies would be defined in regards to the characteristics of the computing resources to be used for particular jobs. The edge management policies would overrule any conflicting grid job scheduling policies.

Figure 2:
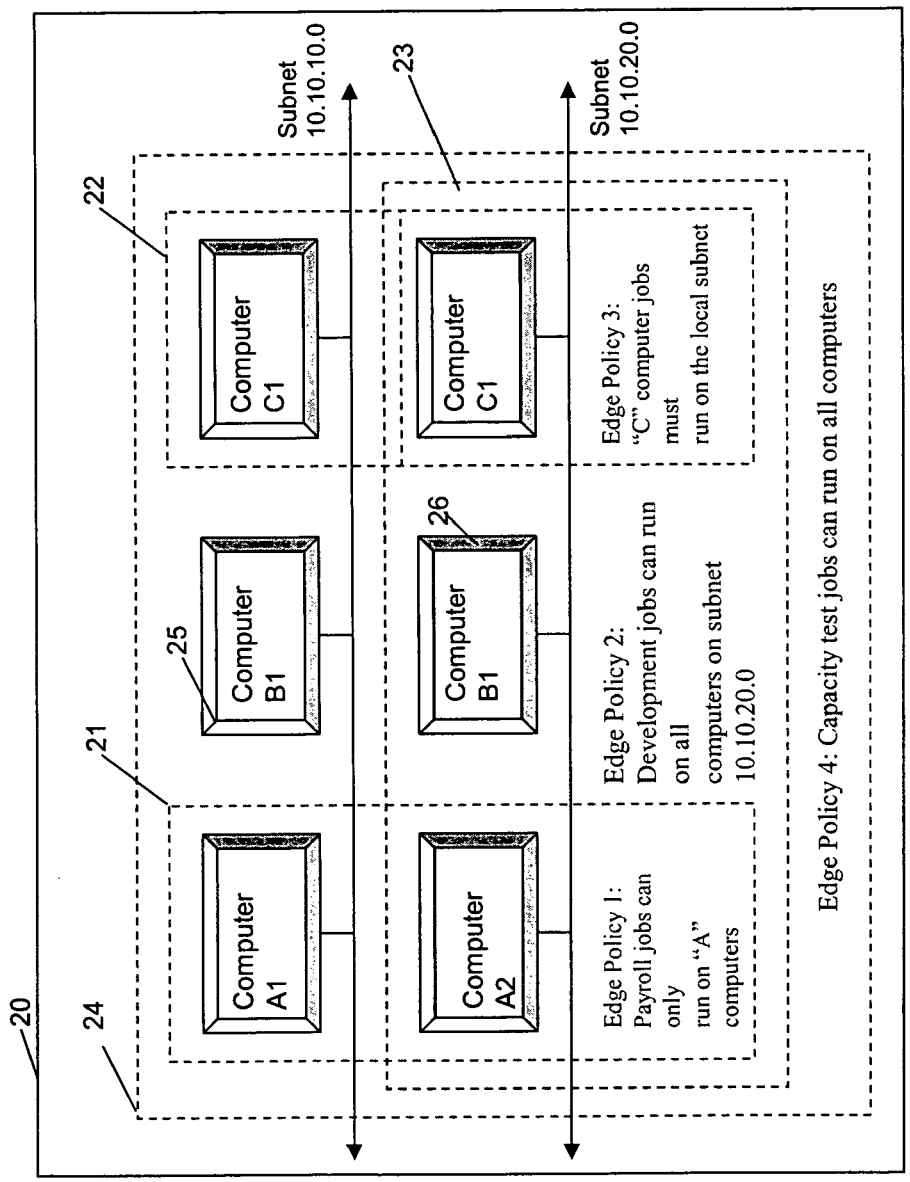
FIG. 2 is a diagram of edge policies in a grid environment.

The edge policies may contain inclusive rules, exclusive rules, or a combination of both, and may be executed based on one or more of hardware, operating system, or application/job. As an example, a global edge policy might provide that all jobs must only run on IBM's Advanced Interactive eXecution operating system (AIX). A job specific policy might additionally require that job X may only run on AIX version 5.2 or on a specific server type. FIG. 2 depicts grid environment 20 that includes examples of edge policies described above.

In FIG. 2, the A computer environment 21 includes computers A1 and A2. The A computer environment 21 has edge policy one, which provides that payroll jobs can only run on A computers. In FIG. 2, the C computer environment 22 includes computers C1 and C2. The C computer environment has edge policy three, which is that C computer jobs must run on the local subnet. C1 and C2 are on different subnets. C1 is on subnet 10.10.10.0 and C2 is on subnet 10.10.20.0. Subnet 10.10.20.0 has its own edge policy (Edge Policy 2), which is that development jobs can run on all computers on subnet 10.10.20.0.

In an exemplary embodiment, a grid enabled payroll job is submitted through the scheduler, and the selected submission parameters specify a parallelism of six, or that the job should be executed across six computers. Although six computers in FIG. 2 are grid enabled and available, edge policy one prohibits the job from traversing outside of the A computer environment 21.

Edge policy 3 controls the C computers in FIG. 2. The C computers in FIG. 2 have even a greater degree of edge restriction than edge policy 1, in that only two C computers are available, each on a different subnet, and edge policy 3 dictates that C computers may not run jobs routed from other subnets.

Edge policy two of FIG. 2 is a less restrictive edge policy than edge policy 3 (i.e., more computers are available to process a job under edge policy 2), where the development grid jobs are permitted to run on any available machine on the subnet.

Finally, edge policy four is the least restrictive of the policies in FIG. 2 and permits capacity test jobs to be run on all available computers.

In an exemplary embodiment, when edge policies overlap, the more restrictive policy would always take precedence over the less restrictive. If a capacity test job were submitted on computer A1 with a parallelism of six, edge policies three and four would overlap and computer C2 would not participate because the job originated on a different subnet. In this embodiment, edge policy three, being more restrictive, would supersede edge policy four. In addition, the combination of edge policies three and four would override the scheduler policy which called for a parallelism of six, because the grid job would only be able to use five computers.

Many edge policies may be defined with a great variety of criteria taken into account. A weighted hierarchy of policy definitions can be created. In an exemplary embodiment, all criteria of all overlapping policies would have to be met in order for the resource to be used. In another exemplary embodiment, a hierarchical model could enforce the most restrictive policies or could enforce the least restrictive policies. The following are examples of edge manager criteria or policies. Each of these criteria could be applied on their own or combined with other criteria and enforced in accordance with the policies described above.

Application Job Type
    As in the previous examples, many edge policies are likely to be defined based on the grid application job type. Generally, applications that process sensitive data would have very restrictive edge policies. Other grid application jobs that do not deal with sensitive data may be permitted much broader edge policies.

Cluster Participation
    If the computers are already part of a high performance computing cluster, a quasi grid (i.e., a policy that isolates these nodes from external grids) may be desirable.

Server/platform Type
    Some platforms are highly customized and tuned for very specific purposes, in which case an exclusionary edge policy might be desired such that only a small subset of all grid job types would be permitted to execute on these platforms. For example, an edge policy could be to not use Pentium computers.

Specific IP/MAC Address Mapping
    Rather than defining edge policies based on job type, edge policies may be defined by the specific job parallelism permitted based on the specific IP/MAC address that is executing or originating a particular grid job.

Source Subnet/Network
    As discussed above, in an exemplary embodiment, edge definitions are based on source and/or target subnets/networks. For example, edge policy 2 in FIG. 2 is based on a subnet that associates a particular group of computing nodes addressable by a common address, yet distinguishable by another subnet address.

Source Hostname/Username
    In another exemplary embodiment, an edge policy uses the names of machines to define the edge for a particular job or job type. As an example, in a country-wide collaborative research effort, all participants name their machines in a specific manner, such as research_1project_6, etc. As a participating job executes on the logical grid, a scheduler scans every grid enabled computer in the country to find participating computers with conforming names.

Number of Hops to Destination

In another exemplary embodiment, an edge policy is a specific number of router or switch hops. If a subnet is known to require no more than two hops to route between any set of machines, even though a machine three hops away may seem to meet job or overlapping edge criteria, the subnet is excluded because the subnet is outside of the two hop limit in this particular edge policy.

Communications Protocol

An edge policy that uses communications protocol may be used to permit broad edge policies for specific job types. For example, a highly paralleled job is permitted to traverse the grid and execute on any machine running the TCP/IP protocol.

Attenuation

In another exemplary embodiment, the edge policy is hardware enabled. A hardware enabled edge policy may be used to secure a campus environment where jobs are not permitted to run outside the campus. Prior to executing a job on a machine that meets all the other edge policies, an attenuation test would be run against the target machine in order to determine the target machines real distance from the source machine, thereby ensuring that a machine outside of the campus is not being used.

The edge polices described above are merely exemplary of possible edge policies and are not intended to be an all-inclusive list. In light of the teachings of this patent document, one of ordinary skill in the art will recognize other examples of edge policies.

There are multiple reasons why it may not be desirable for a computer to participate in a grid, particularly one controlled by an outside organization. Possible reasons include quality of performance or sensitivity of data on the computer. In another exemplary embodiment, policies could be set that prevent a computer from being part of such an outside grid.

In embodiments of the present invention that involve an organization parallelizing jobs outside of the organization's own internal grid, the schedulers of the organization and the outside grid would need to be able to communicate with each other. For example, any computer running TCP/IP can easily communicate with another computer that is running TCP/IP. However, there are currently no standards for cross boundary scheduler coordination. If grid communications standards are developed, the present invention could utilize such standards. One of ordinary skill in the art would appreciate that the embodiments of the invention described herein are not limited by the communication protocols or methods used between the schedulers. Until such communication standards are established, a set of application program interfaces can be used to enable communications between unlike protocols.

Figure 3:
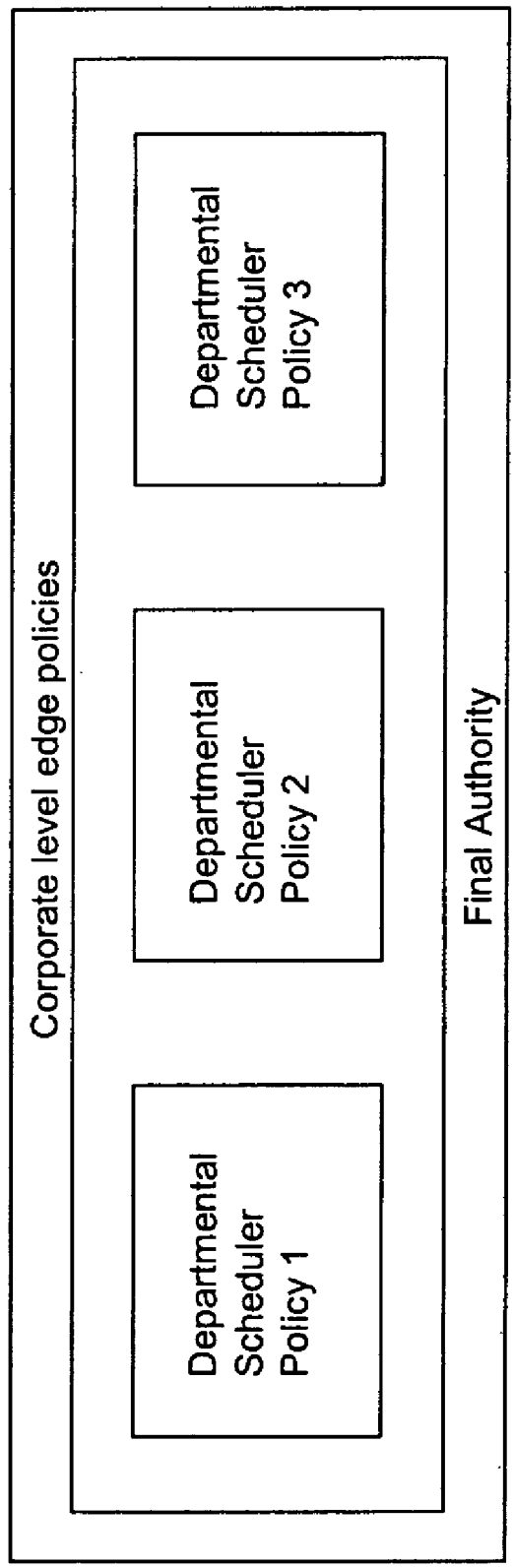
FIG. 3 is a diagram of a hierarchy of edge policies.

In another exemplary embodiment, the edge manager is intended to override departmental policies set in grid schedulers and routers. Additional edge policies will evolve as necessary to address specific requirements introduced in the grid schedulers and routers. In FIG. 3, the individual department policies are a subset of and are controlled by the corporate level edge policies, which are the final authority.

Figure 4:
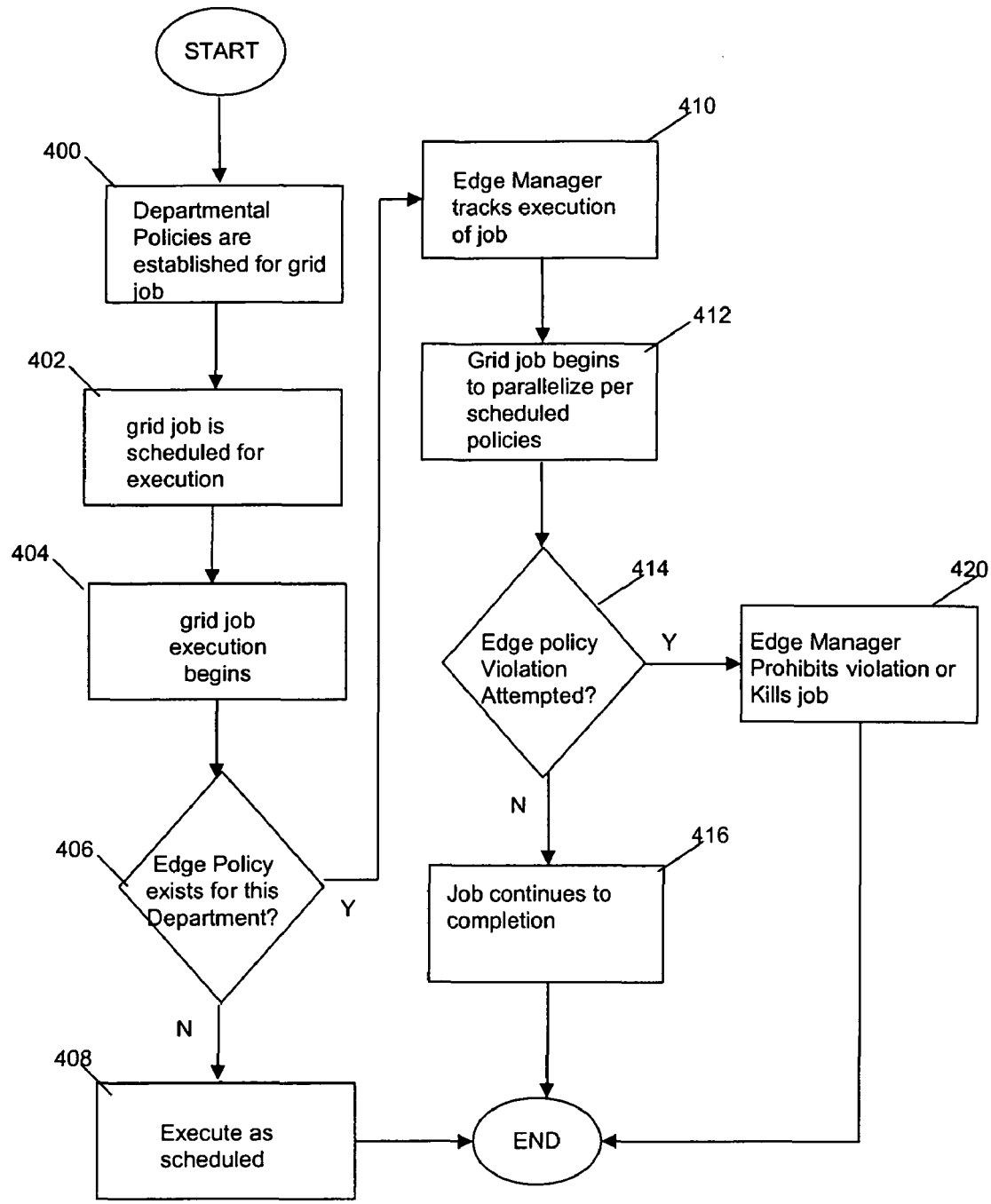
FIG. 4 is a flow diagram of a method for edge management in a grid environment.
Figure 6:
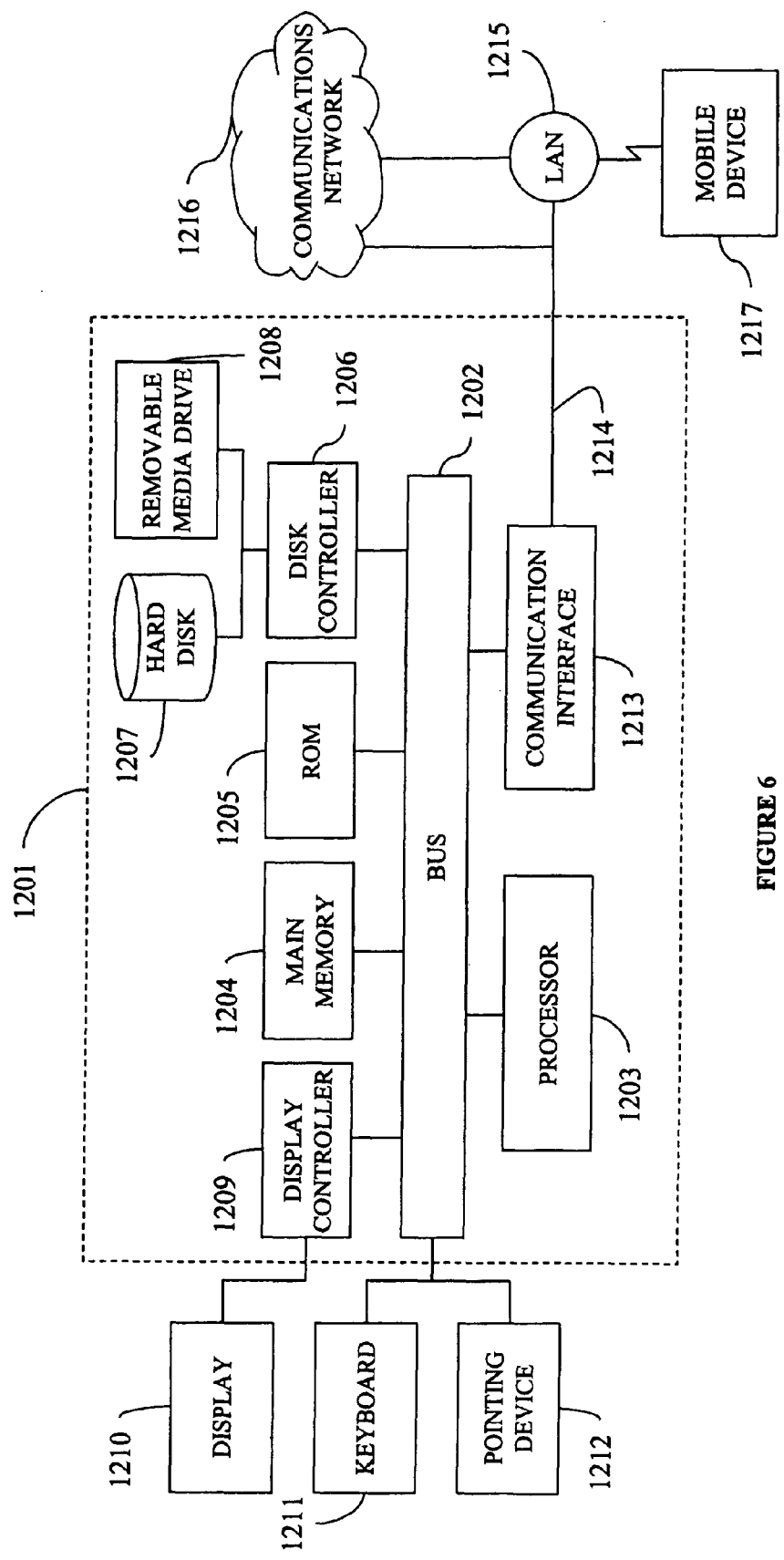
FIG. 6 is a block diagram of a computer system upon which an embodiment of the present invention may be implemented.

FIG. 4 is a flowchart illustrating an embodiment of the present invention in which Edge management and scheduling functions are performed as software processes on a common computer, like that shown in FIG. 6. In step 400, departmental policies are established for a grid job and stored on a computer's memory. In another embodiment, departmental policies include higher level corporate policies. Proceeding to step 402, the grid job is scheduled by a grid scheduler module for execution. Proceeding to step 404, execution of the grid job begins. Proceeding to step 406, the edge manager determines whether an edge policy exists for a particular department. Proceeding to step 408, if there is no edge policy in place, then the job is executed as scheduled.

In an alternative embodiment, the edge policy is applied every time a job moves to a different set of features, which are outside the scope of the policies originally defined. As an example of a job moving to a different set of features, if the degree of parallelism requested was 10, but only 8 nodes were initially available, the edge policy is applied to enable the use of the 8 available nodes instead of the requested 10. Then, when two more nodes became free, the job could use them, but only after applying the edge policy to the two added nodes.

If there is an edge policy in place, the process proceeds to step 410 where the edge manager tracks the execution of the job. Proceeding to step 412, the grid job begins to parallelize in accordance with the scheduled policies. Before the grid job can parallelize, the scheduler must determine if a potential node is a candidate for the particular grid job. The scheduler communicates with the scheduler on the other machines and queries them. The query is related to any or all of the following and other possible criteria: protocol (i.e. determine if schedulers are interoperable); is there virus protection, how current is the virus protection; what kind of operating system is running; how much memory is available, etc.

In another embodiment, in step 412, the edge manager transmits an agent to the node processing the job. The agent may be a daemon process, API, or a software module that can collect data with respect to specific grid devices and report back to the edge manager. The agent is transmitted to the node parallelized to process the grid job and this agent transmits information about the node back to the edge manager. There is also an agent transmitted to the scheduler of the node. This second agent passes the ability to track and enforce the edge polices to the scheduler of the node. The second agent keeps the scheduler from passing the grid job off to another node that does not satisfy the edge policies. If the scheduler attempts to pass the job off, the agent prevents that action or takes some preventive measures. In another embodiment, the agents can query potential nodes and their schedulers and relay that information to the edge manager, which would manage the resources remotely.

The process proceeds to step 414 where the edge manager determines if a violation of an edge policy is attempted. If there is no violation of the edge policy, the process continues on to step 416 and the job continues to completion. If a violation is attempted, the process proceeds to step 420 and the edge manager prohibits the edge policy violation. In another embodiment, the agent sent out by the edge manager can prohibit the violation. The violation may be prohibited by transmitting a command or by stopping the transmission of data. In yet another embodiment, the edge manager may first allow the transmission of data to proceed and then make the determination as to whether an edge policy is being violated. In this case, if the edge manager determines that an edge policy is indeed being violated, transmission is ceased by the edge manager itself or by its issuance of a corresponding command to cease transmission.

In another exemplary embodiment, the edge manager can operate within a single cluster. For example, if a corporate policy is that payroll machines run only payroll jobs and someone inadvertently scheduled the payroll machines to be part of a cluster job, the edge manager would prohibit that from happening. In this embodiment, there is local routing rather than remote routing of the job to be paralellized out.

Figure 5:
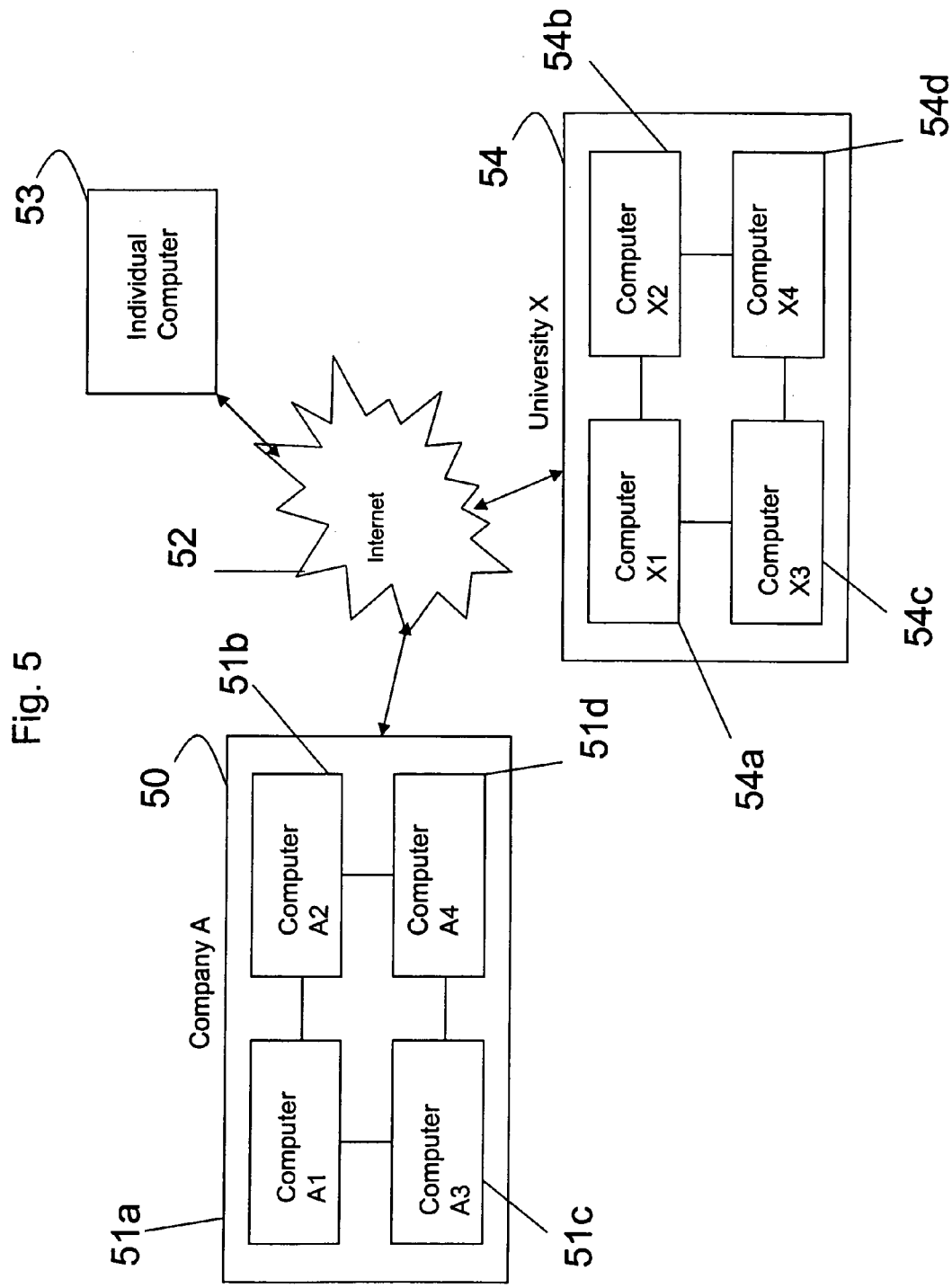
FIG. 5 is an exemplary global grid environment.

FIG. 5 depicts a global grid environment. Company A has a group of computers 51a-51d linked together to form a grid-like cluster. Depending on the edge policies of Company A, grid jobs can use computers outside of the cluster existing within Company A, and use the Internet 52 to access computer processing resources outside of Company A. In an exemplary embodiment, a grid job originating from Company A may be executed on computers 54a-54d of University X. The edge manager of Company A ensures that the computers of University X comply with the edge policies established at Company A. In an exemplary embodiment, Company A implements an edge policy that allows a grid job to parallelize out to any computer not operating with a Pentium processor. Before the job is parallelized out, the edge manager of Company A will ensure that the processors on computers 54a-54d do not have Pentium processors. The edge manager can monitor computers 54a-54d, or in another exemplary embodiment, the edge manager can implant agents on the computers 54a-54d and have the agent monitor the computers.

In another exemplary embodiment, University X operates its own edge manager. The edge manager of University X ensures that the computers 54a-54d operate in compliance with the edge policies for outside computers linking to inside computers 54a-54d established by University X.

Grid jobs do not have to be parallelized out to more than one computer or computers of other organizations. Instead they may run on a single computer. In another exemplary embodiment, an individual computer 53 that is connected to the Internet can be used to process a grid job originating from Company A. The edge manager or the edge manager's agent will ensure that the computer 53 complies with the edge policies established by Company A.

In another exemplary embodiment, the edge manager continues to monitor the execution of the computing job for compliance with the edge policy through completion of the computing job, even if the scheduler enforces said edge policy.

FIG. 5 uses the Internet as an example of a network. The network could be the global Internet, the Internet by country code, Internet USA, a corporate network (where different organizations could be different departments within a single organization), a subnet, a cluster, a backup server or a server.

FIG. 6 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The terms "computer readable medium" and "computer program product" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present invention are possible in light of the above teachings. For example, the present invention can be used for identification, management of grid enabled resources, and routing of distributed applications. It is therefore to be understood that within the scope of the appended claims, the invention may be practiced otherwise than as specifically described herein.

The invention claimed is:

1. A computer implemented method of edge management, comprising steps of:
   scheduling execution of a computing job with a processor of an edge manager;
   storing an edge policy established at said edge manager for said computing job in a memory device;
   tracking said execution of said computing job with the processor;
   dividing said computing job into portions with the processor;
   assigning the portions of said computing job according to said edge policy with the processor to a computer;
   communicating between the edge manager and a scheduler of said computer assigned to process said computing job with the processor;
   causing, with the processor, the scheduler of said computer assigned to process said computing job to enforce said edge policy established at said edge manager; and
   preventing the scheduler of said computer from passing the computing job off to another computer that does not satisfy said edge policy established at said edge manager.

2. The method of claim 1, further comprising a step of determining if an edge policy exists for said computing job each time a portion of said computing job is assigned to a node in a different computing environment.

3. The method of claim 1, further comprising:
   transmitting a first agent to the computer assigned to process said computing job;
   transmitting a second agent to the scheduler of said computer assigned to process said computing job;
   transmitting information about said computer assigned to process said computing job to the edge manager; and
   causing said scheduler to enforce said edge policy with the second agent.

4. The method of claim 3, wherein said step of assigning further comprises:

placing a query to said computer assigned to process said computing job, wherein said step of transmitting information about said computer assigned to process said computing job to an edge manager is in response to said query.

5. The method of claim 1, wherein said edge policy comprises at least one of:

an application job policy;
a cluster participation policy;
a server/platform policy;
a specific IP/MAC address mapping policy;
a source subnet/network policy;
a source hostname/username policy;
a number of hops to destination policy;
a communications protocol policy; and
an attenuation policy.

6. The method of claim 1, wherein said method is applied within a single computer environment.

7. The method of claim 1, wherein said method is applied across at least one of a global Internet, an Internet by country code, an Internet USA, a corporate network, a subnet, a cluster, and a server.

8. A system for edge management, comprising:

a computing environment configured to communicate with a node outside of said computing environment through a network, said computing environment including,
   a first scheduler configured to schedule execution of a computing job, and
   an edge manager, including a processor, configured to determine if an edge policy established at said edge manager exists for said computing job, to track said execution of said computing job, to divide said computing job into portions, to assign the portions of said computing job to said node according to said edge policy, to communicate between the edge manager and a second scheduler of said node assigned to process said computing job, to cause the second scheduler of said node assigned to process said computing job to enforce said edge policy established at said edge manager, and to prevent the second scheduler of said node from passing the computing job off to another node that does not satisfy said edge policy established at said edge manager.

9. The system of claim 8, wherein said node is inside said computing environment.

10. The system of claim 8, comprising:
a transmission device configured to transmit data to be processed by said node.

11. The system of claim 8, further comprising:
a transmission device configured to transmit a first agent of said edge manager to said node, said first agent configured to transmit information about said node to said edge manager.

12. The system of claim 11, wherein
said transmission device is further configured to transmit a second agent of said edge manager to said second scheduler of said node, said second agent enables said second scheduler of said node to enforce said edge policy.

13. A computer configured to operate in a grid computing environment, comprising:
a first scheduler configured to schedule execution of a computing job; and
an edge manager, including a processor, configured to determine if an edge policy established at said edge manager exists for said computing job, to track said execution of said computing job, to divide said computing job into portions; to assign the portions of said computing job to a node according to said edge policy, to communicate between the edge manager and a second scheduler of said node assigned to process said computing job, to cause the second scheduler of said node assigned to process said computing job to enforce said edge policy established at said edge manager, and to prevent the second scheduler of said node from passing the computing job off to another node that does not satisfy said edge policy established at said edge manager.

14. The computer of claim 13, further comprising:
a transmission device configured to transmit a command that controls the node.

15. The computer of claim 13, further comprising:
a transmission device configured to transmit data to be processed by the node.

16. The computer of claim 15, wherein
said transmission device is further configured to transmit an agent of said edge manager to said node, and
said agent is configured to transmit information about said node to said edge manager.

17. The computer of claim 16, wherein
said transmission device is further configured to transmit a second agent of said edge manager to second scheduler of said node to allow said second scheduler of said node to enforce said edge policy.

18. A non-transitory computer readable storage medium encoded with instructions for execution on a computer system, which when executed by said computer system, causes said computer system to perform said method recited in claim 1.

19. An apparatus for edge management, comprising:
means for scheduling execution of a computing job;
means for storing an edge policy established at an edge manager for said computing job;
means for tracking said execution of said computing job;
means for dividing said computing job into portions means for assigning a portion of said computing job according to said edge policy to a computer;
means for communicating between the edge manager and a scheduler of said computer assigned to process said computing job;
means for causing the scheduler of said computer assigned to process said computing job to enforce said edge policy established at said edge manager; and
means for preventing the scheduler of said computer from passing the computing job off to another computer that does not satisfy said edge policy established at said edge manager.

20. The method of claim 3, wherein said first agent and second agent are one of a daemon process, API, and software module.

21. The system of claim 12, wherein said first agent and second agent are one of a daemon process, API, and software module.

22. The computer of claim 17, wherein said first agent and second agent are one of a daemon process, API, and software module.

23. The method of claim 3, further comprising a step of continuing to monitor said execution of said computing job for compliance with said edge policy through completion of said computing job, even if said scheduler enforces said edge policy.

24. The system of claim 12, wherein
said edge manager continues to monitor said execution of said computing job for compliance with said edge policy through completion of said computing job, even if said scheduler enforces said edge policy.

25. The computer of claim 17, wherein
said edge manager continues to monitor said execution of said computing job for compliance with said edge policy through completion of said computing job, even if said scheduler enforces said edge policy.

* * * * *